United States Patent [19]

Byrd et al.

[11] 4,133,670

[45] Jan. 9, 1979

[54] METHOD OF PREPARING LIQUID MONOAMMONIUM PHOSPHATE FERTILIZER SUSPENSION

[75] Inventors: Michael D. Byrd, Parkville; August R. Scott, Kansas City, both of Mo.

[73] Assignee: Farmland Industries, Inc., Kansas City, Mo.

[21] Appl. No.: 833,151

[22] Filed: Sep. 14, 1977

[51] Int. Cl.$^2$ .................................................. C05B 7/00
[52] U.S. Cl. ............................................. 71/34; 71/43; 71/64 C; 423/308
[58] Field of Search .................... 71/34, 35, 36, 49, 44, 71/64 C, 43, 51, 61; 423/305, 307, 308, 309, 310, 312, 313

[56] References Cited

U.S. PATENT DOCUMENTS

| | | | |
|---|---|---|---|
| 1,866,564 | 7/1932 | Hansen | 71/36 |
| 3,109,729 | 11/1963 | Slack et al. | 71/43 X |
| 3,234,005 | 2/1966 | Smalter et al. | 71/35 X |
| 3,326,666 | 6/1967 | Walters | 71/36 X |
| 3,425,819 | 2/1969 | Barry et al. | 71/35 X |
| 3,565,600 | 2/1971 | Barker | 71/36 |
| 4,008,314 | 2/1977 | Davidson | 71/43 X |
| 4,009,245 | 2/1977 | Hudson et al. | 71/43 X |
| 4,036,627 | 7/1977 | Funk | 71/64 C X |
| 4,066,432 | 1/1978 | Jones | 71/64 C X |

*Primary Examiner*—Kenneth M. Schor
*Attorney, Agent, or Firm*—Schmidt, Johnson, Hovey & Williams

[57] ABSTRACT

A simplified, commercially feasible, split-addition method of producing a liquid, sprayable fertilizer composition which contains ammonium phosphates is disclosed which yields a fertilizer with improved storage properties over prior compositions of this type and capable of being sprayed using existing equipment with a minimum of clogging problems. The method includes initially admixing a fractional portion of a total quantity of monoammonium phosphate (MAP) to be employed with water and adding ammonia thereto so as to induce an essentially instantaneous ammoniation reaction; the remainder of the MAP is then added to yield the final fertilizer composition. The addition of a suspending agent is usually desirable. This split addition of MAP (most preferably a 70% - 30% split) unexpectedly serves to minimize formation of large ammonium phosphate crystals in the fertilizer, so that the storage properties are improved and the composition can be sprayed without fear of frequent clogging of the spraying equipment.

6 Claims, No Drawings

METHOD OF PREPARING LIQUID MONOAMMONIUM PHOSPHATE FERTILIZER SUSPENSION

This invention relates to an improved method for producing a liquid, sprayable fertilizer composition wherein monoammonium phosphate (MAP), water, and ammonia are admixed. More particularly, the method hereof involves a split addition of MAP in a manner to minimize the formation of relatively large ammonium phosphate crystals in the final fertilizer, as the latter are known to cause clogging of conventional fertilizer spraying equipment.

The manufacture and use of liquid fertilizer compositions has been increasing in recent years in the United States. Principal among the advantages of liquid fertilizers is the fact that they can be applied easily using, for example, a boom sprayer, in a manner to assure relatively even coverage over a field. Various types of liquid fertilizer have been proposed in the past, including suspension fertilizers which include ammonium phosphates as components thereof. For example, one known suspension fertilizer, denominated 11-33-0 in the trade, contains about 11% nitrogen and phosphorous generally expressed as 33% $P_2O_5$.

A nagging problem in connection with suspension fertilizers containing ammonium phosphates stems from the fact that relatively large (20 mesh or greater) crystals are frequently present in the compositions. These crystals tend to make storage impractical and to collect in spray nozzles and other critical points in the spraying equipment, thereby blocking the latter. This in turn means that it is impractical to store the materialand in use frequent stops and cleanups are needed during field application with the spraying equipment. Thus, the problem of crystal size in ammonium phosphate suspension fertilizers is a serious one, and any expedient to reudce this problem, and to thus improve storage properties and facilitate spray application of the fertilizers, would represent a significant advance in the art.

Liquid sprayable fertilizer suspensions of the type described are generally produced at rural locations using bulk materials. For example, conventional 11-33-0 suspension fertilizers are generally produced simply by admixing the appropriate quantities of water and monoammonium phosphate, whereupon liquid or gaseous ammonia is added to induce an essentially instantaneous ammoniation reaction. Batch production of such fertilizers is attractive from an economic standpoint, since transportation and handling costs are less than in the case of production of suspension fertilizers at a central plant. As a consequence of using dispersed production facilities however, the opportunities for employment of sophisticated processing techniques is minimized. That is, rural production stations (such as cooperatives) do not possess the necessary equipment, or have the trained personnel, for complicated preparative operations. In fact, most such stations have only the necessary liquid holding and mixing tanks, along with facilities for introducing dry bulk starting materials and ammonia into the tanks.

It is therefore the most important object of the present invention to provide an improved method of making sprayable fertilizer compositions using monoammonium phosphate, ammonia and water as starting materials which is simple and commercially feasible for use by rural production stations not possessing sophisticated processing equipment or trained personnel, and which yields a final essentially liquid composition with improved storage properties which can be sprayed using existing equipment without fear of frequent clogging and consequent cleanup thereof.

As a corollary to the foregoing, another object of the invention is to provide a method wherein the monoammonium phosphate is added in successive steps, i.e., wherein a fractional portion of the overall quantity of monoammonium phosphate to be used is initially admixed with water and ammonia to produce a first mixture and induce a rapid ammoniation reaction, whereupon the remaining portion of the monoammonium phosphate is added to the mixture to give the final sprayable fertilizer composition.

Another aim of the invention is to provide a split addition method of the type described wherein from about 55 to 90% by weight (most preferably about 70% by weight) of the overall quantity of monoammonium phosphate is initially admixed, so as to minimize the formation of relatively large ammonium phosphate crystals in the final fertilizer composition.

In its broadest aspects, the present invention pertains to a split-addition method of making a liquid sprayable fertilizer of the suspension type using monoammonium phosphate, ammonia and water. The improvement comprises the steps of initially admixing a fractional portion of the overall quantity of monoammonium phosphate to be used with respective quantities of water and ammonia to produce a first mixture and induce an essentially instantaneous ammoniation reaction which yields various ammonium phosphates such as mono- and diammonium phosphate. The remaining portion of the monoammonium phosphate is thereafter admixed with the first mixture, preferably before the latter cools, to produce the final liquid sprayable fertilizer with improved storage properties.

In more detail, the initially admixed fractional portion of MAP is preferably from about 55 to 90% by weight of the total thereof employed, more preferably from about 60 to 80% by weight, and most preferably about 70% by weight. In its preferred forms, the method hereof serves to inhibit the formation of relatively large ammonium phosphate crystals in the sprayable composition, i.e., the amount of crystals in the composition which are of 20 mesh size or greater is only up to about 2%, and most preferably only up to about 1%, by weight, of the composition. In other preferred aspects, the method hereof admits of the incorporation of other ingredients into the fertilizer composition. For example, a potassium source such as potash can be added. The most preferred fertilizer in accordance with the invention is denominated an 11-33-0 suspension fertilizer, and the quantities of monoammonium phosphate, ammonia, and water are correlated to give this overall mixture.

In preparative procedures, the appropriate quantity of water is normally pumped into a large mixing tank equipped with a rotating blade or the like. A fractional portion of the total quantity of MAP to be used is then introduced into the mixing tank and dispersed in the water, usually containing a suspending agent. At this point a quantity of ammonia (preferably anhydrous) is introduced into the mixing tank so as to induce an exothermic, essentially instantaneous ammoniation reaction. At this point the remaining portion of the MAP is admixed with the reaction mixture while the latter is still warm. This results in a liquid sprayable fertilizer composition with improved storage properties which is basically in suspension form. A certain proportion of the originally dry components are solubilized in the composition, but a significant portion thereof remains only in suspension. Thus, the addition of a suspending agent such as attapulgite clay is usually desirable, and such an agent is preferably added along with the initial fractional portion of the MAP.

As noted above, the method of the present invention yields a fertilizer composition wherein the formation of relatively large ammonium phosphate crystals is inhibited. The mechanism by which this is achieved is not completely understood; however, actual testing has confirmed that compositions produced in accordance with the methods of the present invention do indeed have only a minimum of objectionably large crystals and are therefore eminently suited for storage and application using conventional spraying equipment.

The following example describes processing methods in accordance with the invention, and gives test results in connection with the final sprayable fertilizer suspensions. However, nothing in the example is to be taken as a limitation upon the overall scope of the invention.

EXAMPLE

A number of 11-33-0 fertilizer suspensions were made using MAP (11-52-0), anhydrous ammonia (82% N), attapulgite clay and water. All suspensions were prepared in two-liter, three-necked flasks equipped with a mechanical stirrer and cold water condenser. Ammonia was added by weight difference from a tared cylinder through a sparge tube extending nearly to the bottom of the flask. The suspensions were placed in thermos bottles immediately after production and allowed to cool for three to four days. A small sample of each suspension was cooled quickly for nitrogen and $P_2O_5$ analysis.

In particular, three series of 11-33-0 suspensions were produced by split addition of MAP. Each suspension was prepared using the following components (by weight):

MAP; 62.86%
$NH_3$; 4.83
$H_2O$; 31.81
Attapulgite clay; 0.50

The first two series of suspensions included a standard batch of 11-33-0 made in the conventional way without a split addition of MAP, and four other batches in which, respectively, 90, 80, 70, and 60% of the MAP was added prior to ammonia addition. The remainder of the MAP was in each case added after the ammonia addition was complete. The final series did not include a 90%-10% MAP split. After cooling, all of the suspensions were evaluated for crystal growth. This was done by sieving approximately 100 grams of material through a series of standard screens (three inch diameter 20 and 35 mesh). This was followed by washing with a cold water/acetone mixture and then with straight acetone. Crystals retained on the screens were dried and weighed to determine weight percent. Analyses for N and $P_2O_5$ and crystal size evaluations for these suspensions are listed in Table I.

As can be seen from the Table, crystal growth (in terms of weight percent of +35 mesh crystals) ranged from a low of less than 1% in the 60%-40% and 70%-30% split additions, to a high of 7-8% in the standard, no split addition control. The results from the 80%-20% and 90%-10% split additions fell between these values. Thus, this test indicates that to achieve maximum benefit from the split addition technique, about 70% of the MAP should be added prior to ammoniation, with the remaining 30% being added subsequently. A lesser percentage addition prior to ammoniation shows minimal improvement over the 70%-30% split with regard to crystal growth and would increase the possibility of ammonia losses during production.

TABLE I

| MAP Split | % N | % $P_2O_5$ | N:$P_2O_5$ | +20 Mesh | −20 + 35 Mesh | Total + 35 |
|---|---|---|---|---|---|---|
| None-Control | 10.84 | 33.18 | 0.327 | 5.04 | 2.32 | 7.36 |
| " | 10.74 | 32.87 | 0.327 | 6.97 | 0.49 | 7.46 |
| " | 10.66 | 32.96 | 0.323 | 5.58 | 1.36 | 6.94 |
| 90% – 10% | 10.99 | 32.82 | 0.335 | 0.74 | 4.37 | 5.11 |
| " | 10.97 | 32.87 | 0.334 | 0.16 | 4.24 | 4.40 |
| 80% – 20% | 10.96 | 32.78 | 0.334 | 0 | 3.42 | 3.42 |
| " | 10.95 | 33.18 | 0.330 | 0 | 3.90 | 3.90 |
| " | 10.89 | 33.13 | 0.329 | 0 | 2.61 | 2.61 |
| 70% – 30% | 10.88 | 32.80 | 0.332 | 0 | 0.82 | 0.82 |
| " | 10.87 | 33.22 | 0.327 | 0 | 0 | 0 |
| " | 10.74 | 33.12 | 0.324 | 0 | 0 | 0 |
| 60% – 40% | 10.89 | 32.62 | 0.334 | 0 | 0.56 | 0.56 |
| " | 10.78 | 32.59 | 0.331 | 0 | 0 | 0 |
| "" | 10.76 | 32.95 | 0.327 | 0 | 0 | 0 |

Having thus described the invention, what is claimed as new and desired to be secured by Letters Patent is:

1. In a batch method of producing a sprayable monoammonium phosphate based suspension fertilizer using conventional batch equipment wherein respective quantities of monoammonium phosphate, anhydrous ammonia and water necessary to produce a batch of said fertilizer of predetermined size are admixed in a reaction zone, the improvement which comprises the steps of first adding from about 60% to about 90% by weight of the quantity of monoammonium phosphate fertilizer to be used in said batch to the entire quantity of water to be incorporated therein to produce a first mixture in said zone, then introducing the entire quantity of anhydrous ammonia into the mixture which is required for said batch thus effecting increase in temperature thereof because of exothermic reaction of the ammonia with the monoammonium phosphate and dilution of the ammonia with water, and prior to cooling of the admixture to essentially ambient temperature, adding the remaining portion of said quantity of monoammonium phosphate at a rate to produce a sprayable monoammonium phosphate based suspension fertilizer product having less than about 2% by weight of monoammonium phosphate crystals which are larger than approximately +20 mesh size.

2. The method as set forth in claim 1 wherein from about 60 to 80% by weight of said quantity of monoammonium phosphate is initially admixed with said quantity of water to produce said first mixture.

3. The method as set forth in claim 1 wherein about 70% by weight of said monoammonium phosphate is initially admixed with said quantity of water.

4. The method as set forth in claim 1 wherein said quantities of monoammonium phosphate, ammonia and water are selected to give a 11-33-0 liquid fertilizer.

5. The method as set forth in claim 1 including the step of adding a suspension agent to said fertilizer.

6. The method as set forth in claim 5 wherein said suspension agent is attapulgite clay.

* * * * *